United States Patent

Sugahara et al.

[11] Patent Number: 6,154,494
[45] Date of Patent: Nov. 28, 2000

[54] VARIABLE LENGTH CODED DATA PROCESSING METHOD AND DEVICE FOR PERFORMING THE SAME METHOD

[75] Inventors: Takayuki Sugahara; Junzo Suzuki; Harukuni Kobari, all of Kanagawa-ken, Japan

[73] Assignee: Victor Company of Japan, Ltd., Yokohama, Japan

[21] Appl. No.: 09/063,845

[22] Filed: Apr. 21, 1998

[30] Foreign Application Priority Data

Apr. 22, 1997 [JP] Japan .................................. 9-104951
Jan. 19, 1998 [JP] Japan .................................. 10-008110

[51] Int. Cl.[7] .................................................. H04N 7/24
[52] U.S. Cl. .......................... 375/240.23; 341/67
[58] Field of Search ........................... 375/240, 240.01, 375/240.02, 240.03, 240.04, 240.05, 240.23; 382/246; 341/67; 348/384.1, 390.1, 404.1, 419.1

[56] References Cited

U.S. PATENT DOCUMENTS 5,299,019  3/1994  Pack ........................................ 348/405
5,666,161  9/1997  Kohiyama ............................... 348/408
5,825,313  10/1998  Kondo ...................................... 341/67

FOREIGN PATENT DOCUMENTS 8-065632  3/1996  Japan .

Primary Examiner—Bryan Tung
Attorney, Agent, or Firm—Anderson, Kill & Olick P.C.

[57] ABSTRACT

Among a first and second video data each being variable length coded data such that an occupancy of a decoder buffer is neither overflown nor underflown, having an end code at a rear end thereof and being comprised of a plurality of compressed portion data, a value related to a buffer occupancy at a decoding timing of the last picture of the first video data is compared by an invalid data amount calculator 13 with the buffer occupancy at the decoding timing of the first picture of the second video data. According to a data amount corresponding to a difference between the occupancies when the result of comparison is a predetermined one, the invalid data of this data amount is added by an invalid data adder 14 to the last picture of the first video data and the second video data is connected by a video data connector 15 to the first video data.

20 Claims, 12 Drawing Sheets

HORIZONTAL →

| DC | 28 | 6 | 0 | -9 | 0 | 6 | 0 |
|----|----|----|----|----|----|----|----|
| 26 | 11 | 18 | 0 | 0 | 6 | 6 | 0 |
| -9 | -8 | 15 | 0 | 0 | 3 | 0 | 0 |
| 0 | 0 | -2 | -4 | 0 | 0 | 1 | 0 |
| 12 | 1 | 9 | 0 | 1 | 0 | 0 | 0 |
| 0 | 0 | -4 | -1 | 0 | 0 | 0 | 0 |
| 7 | 0 | 0 | 1 | 0 | 0 | 0 | 0 |
| 1 | 0 | 0 | -1 | 0 | 0 | 0 | 0 |

↓ VERTICAL

| NO. | RUN | LEVEL | CODE LENGTH | ACCUMULATION | ADDRESS |
|---|---|---|---|---|---|
| 1 | ( 0, | 28 ) | 15BIT | 15BIT | 1 |
| 2 | ( 0, | 26 ) | 15BIT | 30BIT | 2 |
| 3 | ( 0, | -9 ) | 13BIT | 43BIT | 3 |
| 4 | ( 0, | 11 ) | 13BIT | 56BIT | 4 |
| 5 | ( 0, | 6 ) | 9BIT | 65BIT | 5 |
| 6 | ( 1, | 18 ) | 17BIT | 82BIT | 7 |
| 7 | ( 0, | -8 ) | 13BIT | 95BIT | 8 |
| 8 | ( 1, | 12 ) | 16BIT | 111BIT | 10 |
| 9 | ( 1, | 15 ) | 17BIT | 128BIT | 12 |
| 10 | ( 1, | -9 ) | 16BIT | 144BIT | 14 |
| 11 | ( 3, | -2 ) | 9BIT | 153BIT | 18 |
| 12 | ( 0, | 1 ) | 3BIT | 156BIT | 19 |
| 13 | ( 1, | 7 ) | 14BIT | 170BIT | 21 |
| 14 | ( 1, | 9 ) | 16BIT | 186BIT | 23 |
| 15 | ( 0, | -4 ) | 8BIT | 194BIT | 24 |
| 16 | ( 1, | 6 ) | 14BIT | 208BIT | 26 |
| 17 | ( 0, | 6 ) | 9BIT | 217BIT | 27 |
| 18 | ( 1, | 6 ) | 14BIT | 231BIT | 29 |
| 19 | ( 0, | 3 ) | 6BIT | 237BIT | 30 |
| 20 | ( 2, | -4 ) | 13BIT | 250BIT | 33 |
| 21 | ( 1, | 1 ) | 4BIT | 254BIT | 35 |
| 22 | ( 2, | -1 ) | 5BIT | 259BIT | 38 |
| 23 | ( 0, | 1 ) | 3BIT | 262BIT | 39 |
| 24 | ( 4, | 1 ) | 6BIT | 268BIT | 44 |
| 25 | ( 2, | 1 ) | 5BIT | 273BIT | 47 |
| 26 | ( 0, | -1 ) | 3BIT | 276BIT | 48 |
| 27 | (EOB) | | 2BIT | 278BIT | |

TOTAL AMOUNT OF CODE 278 BIT

FIG. 11

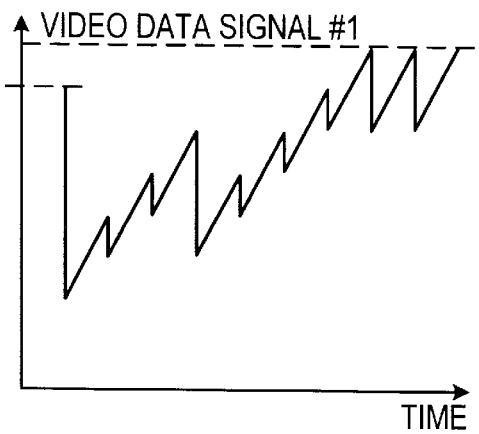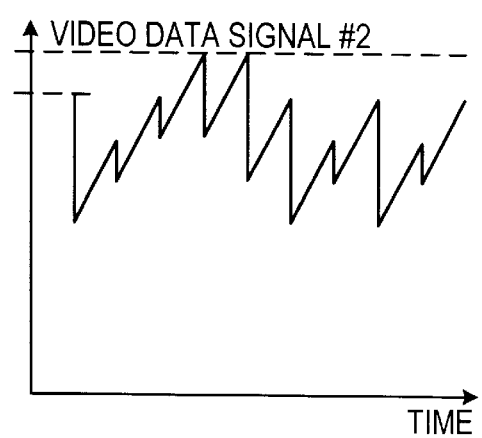
FIG. 16(A)
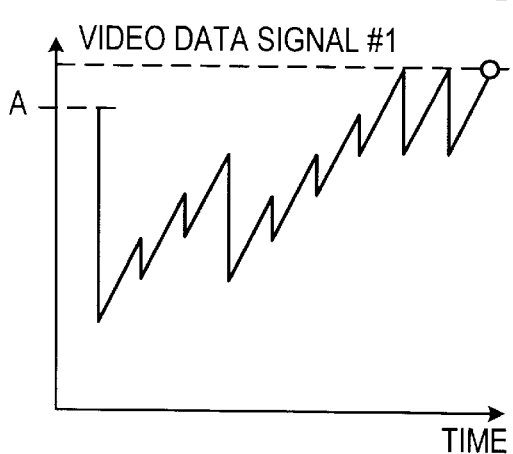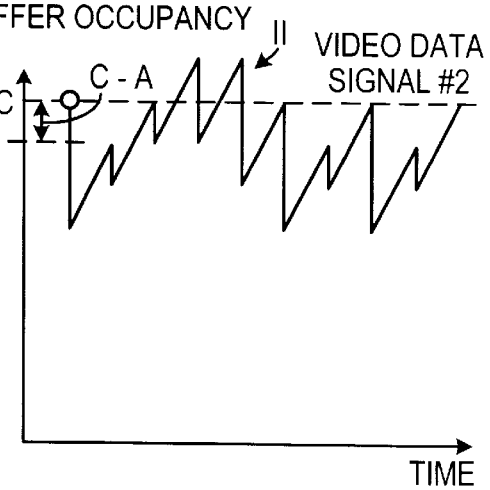
FIG. 16(B)

VARIABLE LENGTH CODED DATA PROCESSING METHOD AND DEVICE FOR PERFORMING THE SAME METHOD

BACKGROUND OF THE INVENTION

1. Field of the Invention

The present invention relates to a variable length coded data processing method and a device for performing the same method and, particularly, to a variable length coded data processing method for connecting a plurality of variable length coded data and coding them and a device performing the same method.

2. Description of the Prior Art

The MPEG (Moving Picture Coding Experts Group) system is a typical example of systems for variable length coding an information. In the MPEG, a coded bit stream in a case of a video signal has an amount of variable length code every picture. The reasons for this are that the MPEG uses information transformation such as discrete cosine transform (DCT), quantization and Huffman coding and that entropy of the coded picture itself is substantially changed since an input image is coded as it is in some case and a differential picture which is a difference between an input picture and a predicted picture is coded in other cases, due to the fact that, in order to improve the picture quality, it is necessary to adaptively change the amount of code delivered to every picture and since a motion compensation prediction is performed.

FIG. 12 shows an example of a coded bit stream according to the MPEG and it is transmitted in a sequence of I picture (intra-frame coded picture), P picture (inter-frame forward predictive coded picture), and B picture (bidirectional predictive coded picture). In this description, the I picture is, for example, 120 kbits, the P picture 80 kbits and the B picture 40 kbits, and they are variable length code amounts.

In a case where such variable length data is coded at a fixed transfer rate (coding rate), assuming that the maximum value of a buffer amount of a decoder is set as shown in FIG. 13, it is defined in the MPEG that a virtual decoder model which receives data at a constant rate and, when the data reaches a predetermined value, performs a decoding in a moment within a predetermined time unit (for a video signal of the NTSC system, 1/29.97 seconds) is connected to an output of a coder and the coding is performed such that the buffer neither overflow nor underflow.

In FIG. 13, capital letter I, B and P depict the I picture (intra-frame coded picture), the B picture (inter-frame forward predictive coded picture) and the P picture (bi-directional predictive coded picture) standardized by MPEG. These pictures are accumulated in the buffer and each is decoded in the time unit of 1/29.97 seconds and the data thereof in the buffer is erased in a moment.

This technique is called as VBV (Video Buffering Verifier) and is described in detail in ISO-11172-2 and IS0138818-2 by the International Organization for Standardization (ISO). According to this standard, the data transfer rate in the VBV buffer becomes a fixed rate when a monitoring time is long enough, although the transfer rate in the VBV buffer varies locally, and the MPEG defines this transfer rate as fixed transfer rate.

When there are a plurality of video data signals which are variable length coded by the compression coding system of the MPEG in screen unit and a user reproduces them in an arbitrary sequence or in a predetermined sequence (for example, when background moving images of a "Karaoke" are displayed in various combinations or when various images for propaganda are displayed in various combinations), it is necessary to couple or connect two video data signals. These video data signals will be referred to as video data signals #1 and #2, respectively.

In order to couple the video data signals #1 and #2 without the overflow and underflow of the VBV buffer, it is necessary that the video data signal #1 is coded first in time and, as shown in FIG. 14, an occupancy of the VBV buffer of the picture of the video data signal #1 at an end time of the video data signal #1 is taken over to an occupancy of a header picture of the video data signal #2 which is to be coded next such that the buffer occupancies become the same in the coupled portion (shown by white circles in FIG. 14).

Therefore, in the conventional variable length coded data processing method in which two video data signals are coupled or connected, it is necessary to preliminarily code them by taking the sequence of combination of the two data signals into consideration. Therefore, it is impossible to couple two video data signals which have been coded randomly. If such randomly coded two video data signals are simply combined, there may be the following problems:

First, it is assumed that a time shift of the occupancy of the VBV buffer of data of two video data signals #1 and #2 which are coded without considering a case where they are coupled as a first pattern becomes as shown in FIG. 15(A). According to this assumption, the buffer occupancies of initial pictures of the video data signals #1 and #2 are common values a, unlike that shown in FIG. 14. When these video data signals #1 and #2 are coupled, it is necessary to make the buffer occupancy of the initial picture of the video data signal #2 to be decoded to b since the buffer occupancy of the video data signal #1 at the end thereof is b as shown in FIG. 15(B) and, therefore, the buffer occupancy of the video data signal #2 is shifted down by (a-b) as a whole. Therefore, there is an underflow in a section shown by I in FIG. 15(B).

Then, it is assumed that a time shift of the occupancy of the VBV buffer of data of two video data signals #1 and #2 which are coded without considering a case where they are coupled as a second pattern becomes as shown in FIG. 16(A). According to this assumption, the buffer occupancies of header pictures of the video data signals #1 and #2 are common values a, unlike that shown in FIG. 14, similarly. When these video data signals #1 and #2 are coupled, it is necessary to make the buffer occupancy of the head picture of the video data signal #2 to be decoded to the maximum value c since the buffer occupancy of the video data signal #1 at the end thereof is the maximum value c as shown in FIG. 16(B) and, therefore, the buffer occupancy of the video data signal #2 is shifted up by (c-a) as a whole and there is an overflow in a section shown by II in FIG. 16(B).

The production of such underflow or overflow is due to that the video data signal #1 is coded without considering the coupling of the buffer occupancy of the head picture of the video data signal #2 to be coded next to the buffer occupancy of the last picture of the video data signal #1. Therefore, there may be a strong possibility that such underflow or overflow similarly occurs in coupling one of the subsequent video data signals to the second video data signal to another.

The term "underflow" means that, at a time when a picture is decoded by the reproducing device, data of the picture is not arrived thereat. Therefore, in such case, it is general to wait for a decoding the second video data signal until a whole data of the second video signal becomes available by, for example, reproducing a preceding video data signal again, that is, freezing the preceding video data signal, that is, the first video data signal, although this may depend upon a construction of the reproducing device.

On the other hand, the term "overflow" means that, when the buffer of the reproducing device is overflowed, data overflowed is lost. Generally, Huffman coding is employed in the MPEG and, if a portion of picture data is lost, the whole picture thereof may be lost.

Further, since the motion compensation prediction is performed, a picture to be predicted by referring to the picture may be lost not only within the display screen but also in a time direction.

SUMMARY OF THE INVENTION

The present invention was made in view of the above mentioned prior art and an object of the present invention is to provide a variable length coded data processing method and a device therefor, which can prevent data drop due to overflow of a buffer of a decoder from occurring and minimize an adverse influence of underflow in combining two coded video data signals.

Another object of the present invention is to provide a variable length coded data processing method and a device therefor, which can prevent overflow and underflow of a buffer of a decoder from occurring by decoding the last scene of a first one of two video data signals to be coupled, according to a predetermined coding system.

A further object of the present invention is to provide a variable length coded data processing method and a device therefor which can reproduce a plurality of coded video data signals continuously for a predetermined time by randomly combining the coded video data signals.

In order to achieve the above objects, a first processing method of the present invention, in which a first and second variable length coded data having end codes at rear ends thereof and each comprised of data of a plurality of compressed portions are coupled and output to a buffer of a decoder, comprises the steps of deleting the end code of the first variable length coded data, comparing a value related to a buffer occupancy at a decoding timing of a data of the last compressed portion of the first variable length coded data with a buffer occupancy at a decoding timing of a data of the initially compressed portion of the second variable length coded data, calculating an invalid data of a data amount corresponding to a result of the comparison, adding the calculated invalid data to the last compressed portion data of the first variable length coded data and coupling the second variable length coded data thereto and outputting it to the decoder buffer.

In the method of the present invention, calculating the data amount corresponding to the result of comparison of the value related to the buffer occupancy at the decoding timing of the data of the last compressed portion of the first variable length coded data with the buffer occupancy at the decoding timing of the data of the first compressed portion of the second variable length coded data, the data amount is added to the last compressed portion data of the first variable length coded data as the invalid data and then the second variable length coded data thereto. Therefore, it is possible to reduce the buffer occupancy at the decoding timing of the last compressed portion data of the first variable length coded data by the amount of the invalid data and to prevent the buffer of the decoder from at least being overflown.

Further, in order to achieve the above mentioned objects, a second processing method of the present invention, in which, after a coefficient obtained by orthogonal transform of an input signal is quantized, a first and second variable length coded data each variable length coded such that occupancy of a buffer of a decoder is not overflow or underflow, having an end code at an end thereof and composed of data of a plurality of compressed portions are combined and output to the buffer of the decoder, comprises the steps of, after the end code of the first variable length coded data is deleted, calculating an amount of deleting code of a data amount of a difference value between a value related to a buffer occupancy at a decoding timing of the last compressed portion data of the first variable length coded data and a buffer occupancy at a decoding timing of the data of the initial compressed portion of the second variable length coded data when the latter buffer occupation value is larger than the value related to the buffer occupancy, deleting a code corresponding to an A.C. component of data described in a predetermined number of compressed portion data including data of at least the last compressed portion of the first variable length coded data by the deleting code amount and then coupling the second variable length coded data thereto.

Since, in this method of the present invention, the code corresponding to the A.C. component of data described in the predetermined number of compressed portion data including data of at least the last compressed portion of the first variable length coded data is deleted by the deleted code amount when the value related to the buffer occupancy at the decoding timing of the last compressed portion data of the first variable length coded data is smaller than the buffer occupancy at the decoding timing of the data of the initial compressed portion of the second variable length coded data, it is possible to couple the data of the last compressed portion of the first variable length coded data to the data of the initial compressed portion of the second variable length coded data with the same occupancy of the buffer of the decoder.

Further, a third processing method of the present invention comprises the steps of, after the end code of the first variable length coded data is deleted, coding a data described in data a predetermined number of compressed portions including a data of at least the last compressed portion of the first variable length coded data under assumption that a motion vector is 0 and the motion compensated error data is 0, when a buffer occupancy at a decoding timing of the data of the initial compressed portion of the second variable length coded data is larger than a value related to a buffer occupancy at a decoding timing of data of the last compressed portion of the first variable length coded data and then the second variable length coded data is coupled thereto.

Since, in this invention, the data described in data in a predetermined number of compressed portions including data of at least the last compressed portion of the first variable length coded data is coded under assumption that a motion vector is 0 and the motion compensated error data is 0, when the buffer occupation value at the decoding timing of the data of the first compressed portion of the second variable length coded data is larger than the value related to the buffer occupancy at a decoding timing of data of the last compressed portion of the first variable length coded data, it is possible to couple the second variable length coded data to the data of the last compressed portion of the first variable length coded data with the same occupancy of the buffer of the decoder.

Further, in order to achieve the above objects, a first variable length coded data processing device according to the present invention in which a first and second variable length coded data having end codes at rear ends thereof and each comprised of data of a plurality of compressed portions are coupled and output to a buffer of a decoder, comprises an end code remover for deleting the end code of the first variable length coded data, a calculator for calculating an invalid data of a data amount corresponding to a result of comparison of a value related to a buffer occupancy at a decoding timing of a last compressed portion data of the first variable length coded data, the end code thereof being deleted by the end code remover, with a buffer occupancy at a decoding timing of a first compressed portion data of the second variable length coded data, an adder for adding the invalid data calculated by the calculator to the last compressed portion data of the first variable length coded data and a connector for coupling the second variable length coded data to the first variable length coded data added with the invalid data from the adder and outputting it to the buffer of the decoder.

In this device of the present invention, it is possible to lower the buffer occupancy at the decoding timing of the data of the last compressed portion of the first variable length coded data by an amount corresponding to the invalid data to thereby prevent the buffer of the decoder from being at least overflown, as in the first processing method of the present invention.

A second processing device of the present invention comprises a memory circuit for preliminarily storing a buffer occupation value OC at a decoding timing of data of the last compressed portion of a first variable length coded data, a code amount DB of the data of the last compressed portion, a code amount IB input to a decoder in a time period from a time at which the data of the last compressed portion to a time at which data of a next compressed portion is decoded and a buffer occupancy NOC at a decoding timing of data of the first compressed portion of a second variable length coded data as a coding information, an end code remover for deleting an end code of the first variable length coded data, a calculator for calculating a value represented by (OC−DB+IB) on the basis of the coding information read out from the memory circuit, comparing the value with the buffer occupancy NOC and calculating an amount of code to be deleted represented by {NOC−(OC−DB+IB)} only when NOC>(OC−DB+IB) and by 0 when NOC≦(OC−DB+IB), a code remover for deleting a code corresponding to an A.C. component of the data described in a data of a predetermined number of compressed portions including the data of at least the last compressed portion of of the first variable length coded data derived from the end code remover by an amount of code to be deleted which is input from the calculator and a connector for connecting the second variable length coded data to the first variable length coded data output from the code remover.

Since, in this device of the present invention, the code corresponding to an A.C. component of the data described in the data of the predetermined number of compressed portions including the data of at least the last compressed portion of the first variable length coded data derived from the end code remover is deleted by the amount of code to be deleted which is input from the calculator, even when the buffer occupancy at the decoding timing of the data of the first compressed portion of the second variable length coded data is larger than the value related to the buffer occupancy at the decoding timing of the data of the last compressed portion of the first variable length coded data. Therefore, it is possible to connect the data of the first compressed portion of the second variable length coded data to the data of the last compressed portion of the first variable length coded data with the same buffer occupancy of the decoder.

Further, according to a third processing device of the present invention, the calculator of the second processing device is modified such that it calculates the value represented by (OC−DB+IB) on the basis of the coding information read out from the memory circuit, compares the value with the buffer occupancy NOC and sets a code transform flag to a predetermined value only when NOC>(OC−DB+IB). Further, in lieu of the code remover of the second processing device, transform means for coding the data described in the data of the predetermined number of compressed portions including the data of at least the last compressed portion of the first variable length coded data from the end code remover under assumption that the motion vector is 0 and the motion compensated error data is 0, when the code transform flag from the calculator has the predetermined value, is provided.

Since, in the third processing device, the data described in the data of the compressed portions including the data of at least the last compressed portion of the first variable length coded data is coded under assumption that the motion vector is 0 and the motion compensated error data is 0, even when the buffer occupancy at the decoding timing of the data of the first compressed portion of the second variable length coded data is larger than the value related to the buffer occupancy at the decoding timing of the data of the last compressed portion of the first variable length coded data, it is possible to connect the data of the last compressed portion of the first variable length coded data and the data of the first compressed portion of the second variable length coded data with the same occupancy of the buffer of the decoder.

Further, since, in the present method and device, the last scene of the first variable length coded data is coded to a still picture or a picture which can be approximated to a still picture, it is possible to minimize an amount of code produced in the last scene and to make the shift amount of the buffer occupancy maximum.

BRIEF DESCRIPTION OF THE DRAWINGS

FIG. 11 shows an example of A.C. coefficient code;

FIGS. 16(A) and 16(B) show graphs for explaining an example of the variation of the decoder buffer occupancy of two video data signals when overflow occurs and a coupling of them.

DETAILED DESCRIPTION OF THE PREFERRED EMBODIMENTS

Figure 1:
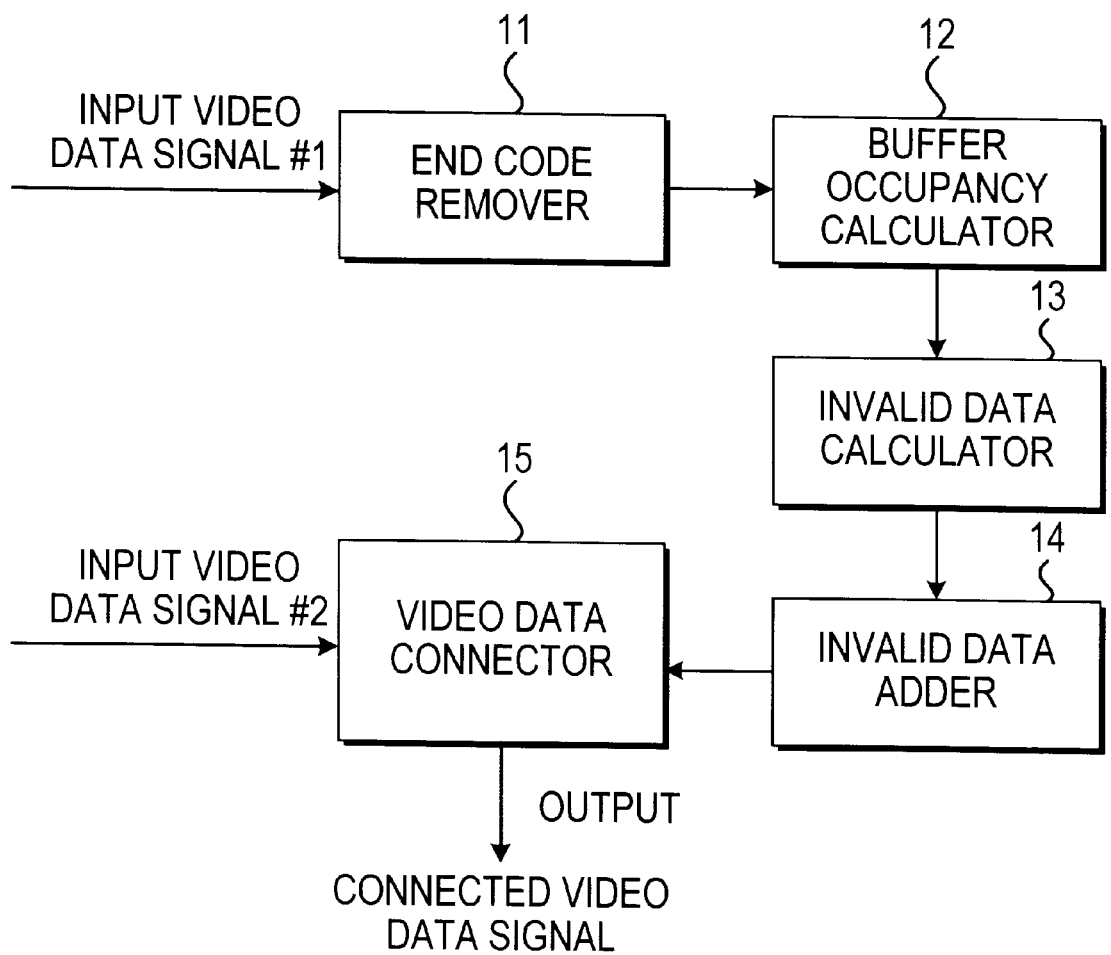
FIG. 1 is a block diagram showing a first embodiment of the variable length coded data processing device according to the present invention.

Now, preferred embodiments of the present invention will be described with reference to the drawings. FIG. 1 is a block diagram of first embodiment of a variable length coded data processing device according to the present invention. In the same figure, the variable length coded data processing device includes an end code remover 11 to which a coded video data signal #1 is input, a buffer occupancy calculator 12 which receives the video data signal #1 from the end code remover 11, an invalid data calculator 13 which receives an output signal of the buffer occupancy calculator 12, an invalid data adder 14 and a video data connector 15 for connecting or coupling a coded video data signal #2 to an output signal of the invalid data adder 14. The construction of the variable length coded data processing device shown in FIG. 1 is usually realized by a software of a computer.

An operation of the variable length coded data processing device according to this embodiment will be described. Among two video data signals #1 and #2 variable length coded according to the MPEG, the video data signal #1 is input to the end code remover 11 and the video data signal #2 is input to the video data connector 15.

The end codes each of a predetermined value (for example, 000001B7 in hexadecimal notation) are added to ends of the video data signals #1 and #2, respectively. The end code remover 11 removes the end code attached to the end of the video data signal #1 such that no trouble occurs in a reproducing operation when the second video data signal #2 is coupled to the end of the input video data signal #1.

The buffer occupancy calculator 12 responds to the video data signal #1 input from the end code remover 11 whose end code is removed thereby to detect a buffer occupancy OC corresponding to an occupation rate of the decoder buffer at a decoding timing of the last picture, which is described in a header of the last picture, and to calculate an amount DB of data bits of the last picture of the video data signal #1 and an amount IB of code, that is, input bits, input to the reproducing device during a time period from a time at which the last 1 picture is decoded to a time when the picture of the next video data signal #2 is input as it is. The input bits IB of code is obtained from a transfer rate described in the header and a known decoding period.

The invalid data, that is, stuff bits, calculator 13 receives the video data signal #1 supplied from the buffer occupancy calculator 12 and having the end code thereof removed, the above mentioned buffer occupancy OC, the amount DB of picture code and the amount IB of code and decides whether or not a next occupancy NOC of the decoder buffer at a decoding timing of a first picture of the video data signal #2 to be coupled next satisfies the following inequality:

$$NOC < (OC - DB + IB) \tag{1}$$

The buffer occupancy NOC is described in the first picture of the video data signal #2 and usually has a constant value in respective video data signals. Therefore, this is used as a known fixed value.

When the above inequality (1) is satisfied, then the invalid data calculator 13 calculates stuff bits SB according to the following equation:

$$SB = (OC - DB + IB) - NOC \tag{2}$$

On the other hand, when the above inequality (1) is not satisfied, the stuff bits calculator 13 makes the value of the stuff bits SB zero.

The invalid data, that is, stuff bits, adder 14 adds stuff bits the number of which corresponds to the stuff bits SB supplied from the stuff bits calculator 13 to the last one picture of the video data signal #1 having the end code removed and supplies a result thereof to the video data connector 15. The invalid data, that is, the stuff bits data, is a data composed of, for example, 0 bits.

The video data connector 15 outputs the video data signal #1 to which the stuff bits are added by the stuff bits adder 14 and then the video data signal #2 to be coupled, resulting in that a coupled video data signal is output from the video data connector 15, which is supplied to a buffer of a decoder which is not shown.

The coupling operation of the video data connector 15 will be described in more detail. The coupling state of the video data signals #1 and #2 can be classified to three patterns shown in FIGS. 2(A), 2(B), 2(C) and 3.

As shown by EO in FIG. 2(A), a first pattern corresponds to a case where a value (OC−DB+IB) which is a sum of a difference between the buffer occupancy OC of the last 1 picture of the last picture of the video data signal #1 and the data bits DB of the same last 1 picture and the input bits IB is the same as the buffer occupancy NOC at the picture decoding timing of the first picture of the video data signal #2. Since, in this case, the inequality (1) is not satisfied, the stuff bits SB is made 0.

Therefore, the coupled video data signal obtained by the video data connector 15 takes in the form a simple series coupling of the video data signals #1 and #2. The first pattern is an ideal pattern with which there is neither overflow nor underflow even when these video data signals are directly coupled and is a very rare case.

As shown by EO in FIG. 2(B), a second pattern is a pattern in which there is a possibility of overflow when the video data signals #1 and #2 are coupled directly. In this case, the value (OC−DB+IB) is larger than the buffer occupancy NOC and the inequality (1) is satisfied. Therefore, an invalid data corresponding to the stuff bits SB calculated by the stuff bits calculator 13 according to the equation (2) is added to the end of the last picture of the video data signal #1 and output and then the video data signal #2 is output.

Since, therefore, the occupancy of the decoder buffer varies as shown by a dotted line III in FIG. 2(B) during a time from the decoding timing of the last picture of the video data signal #1 to the decoding timing of the first picture of the video data signal #2, the video data signals #1 and #2 are coupled with using the occupancy which is the same as the buffer occupancy NOC at the decoding timing of the first picture of the video data signal #2. Thus, in the case of the second pattern, these video data signals are coupled ideally and it is possible to exclude overflow or underflow.

Figure 2:
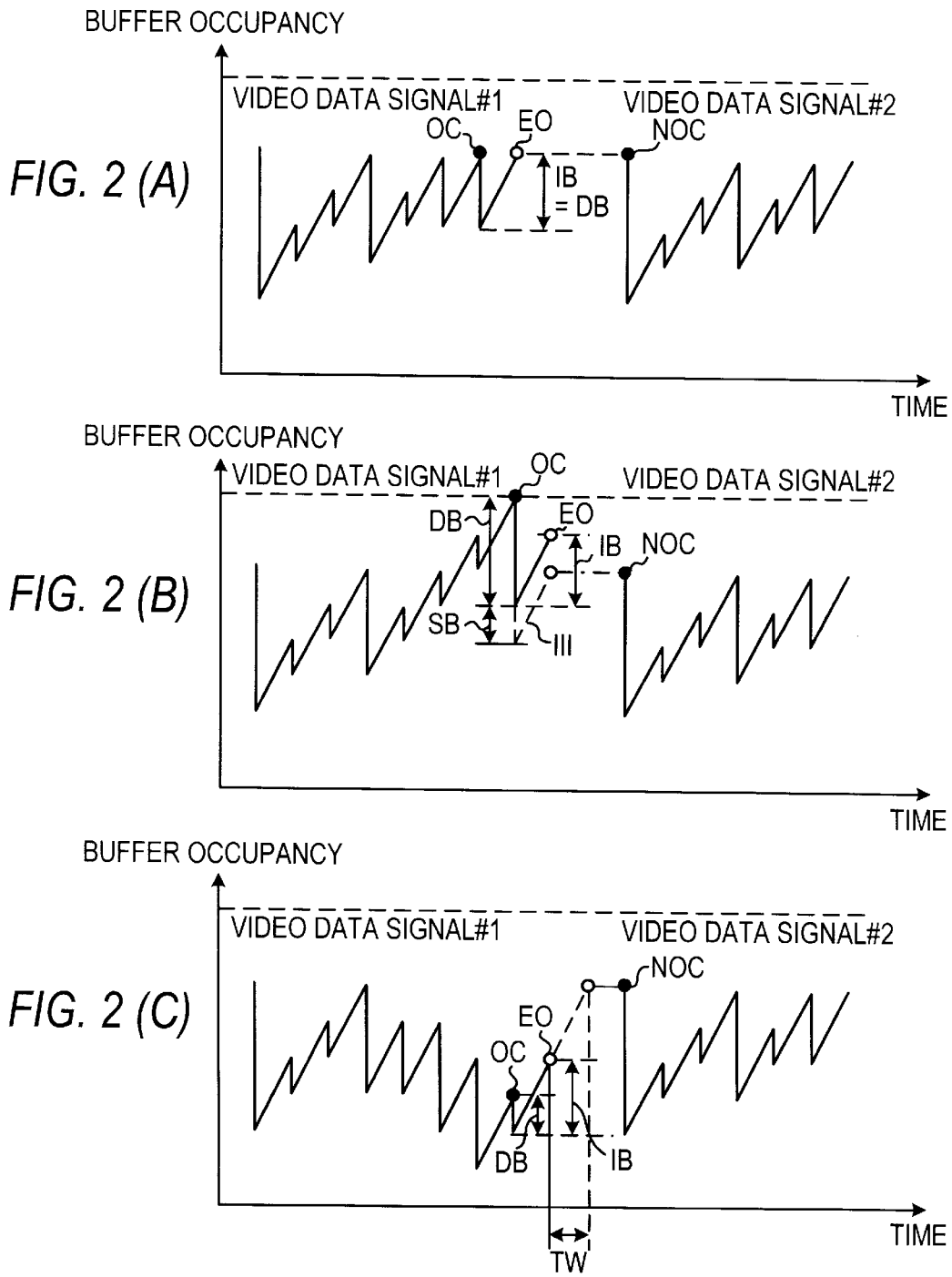
FIGS. 2(A), 2(B) and 2(C) show graphs for explaining a data coupling operation according to the present invention.
Figure 3:
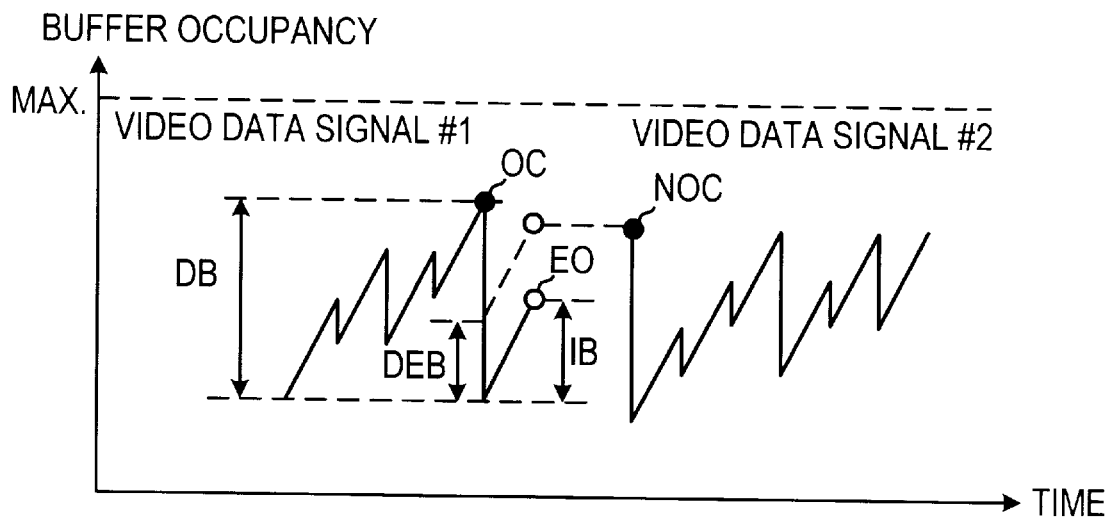
FIG. 3 is a graph showing an example of data coupling operation in an embodiment shown in FIG. 6.

A final, third pattern shown by EO in FIGS. 2(C) and 3 corresponds to a case where the value (OC−DB+IB) is smaller than the buffer occupancy NOC at the decoding timing of the first picture of the next video data signal #2. In this case, the following inequality is established:

$$NOC > (OC-DB+IB) \quad (3)$$

Since, therefore, the inequality (1) is not satisfied, the stuff bit SB is made 0.

Figure 15A:
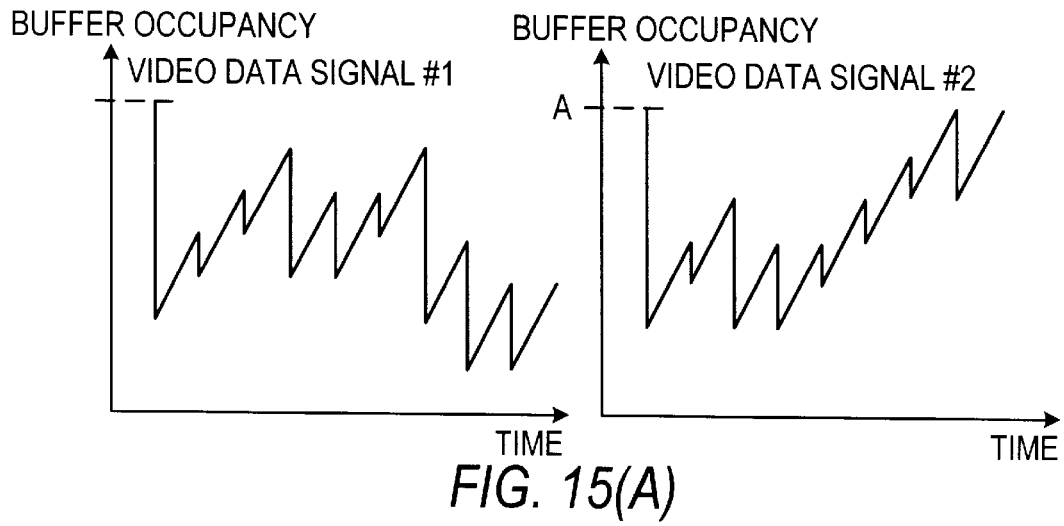
FIGS. 15(A) and 15(B) show graphs for explaining an example of the variation of the decoder buffer occupancy of two video data signals when underflow occurs and a coupling of them.
Figure 15B:
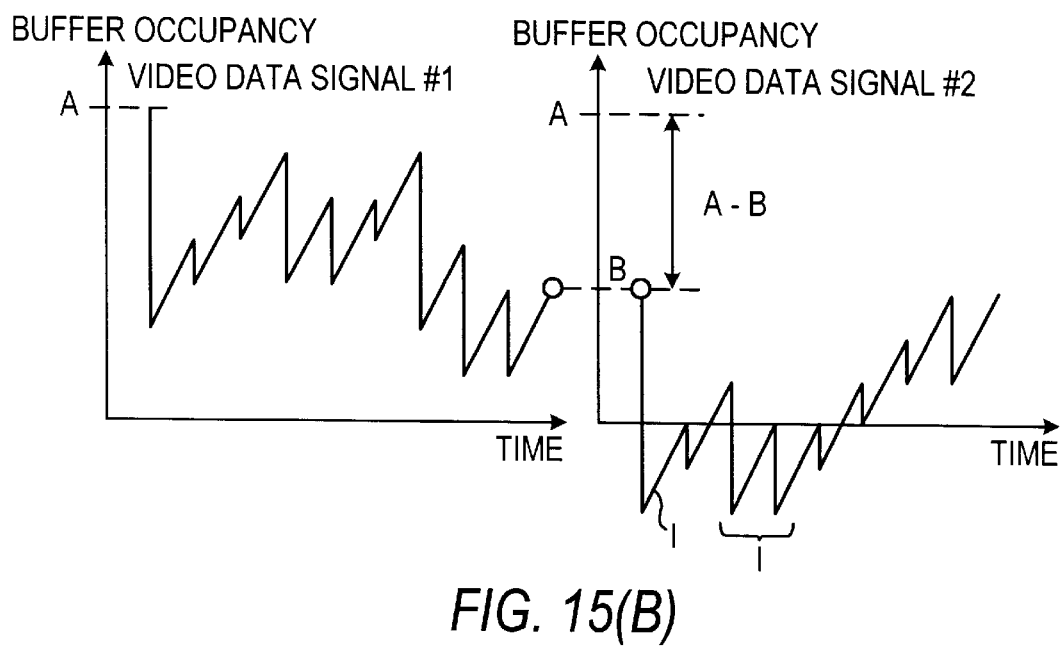

In the third pattern, however, there is a possibility of underflow when the video data signals #1 and #2 are directly coupled, as mentioned with respect to FIGS. 15(A) and 15(B). In the first embodiment, since, for the third pattern, the decoding is performed after a time Tw from a time at which the last picture of the video data signal #1 is stored in the decoder buffer to a time at which the first picture of the next video data signal #2 is stored and then decoded, the picture of the video data signal #1, which is decoded lastly, is displayed twice. However, since, as shown in FIG. 2(C), the last picture of the video data signal #1 is coupled with the buffer occupancy NOC at the decoding timing of the first picture of the next video data signal #2 and there is no overflow, it is possible to avoid the data drop-out which is the worst situation.

As described, in this embodiment, when the video data signals which may result in overflow are coupled, it is possible to ideally couple these signals by adding the stuff bits and, when the video data signals which may result in underflow are coupled, it is possible to at least avoid the data drop out.

Figure 4:
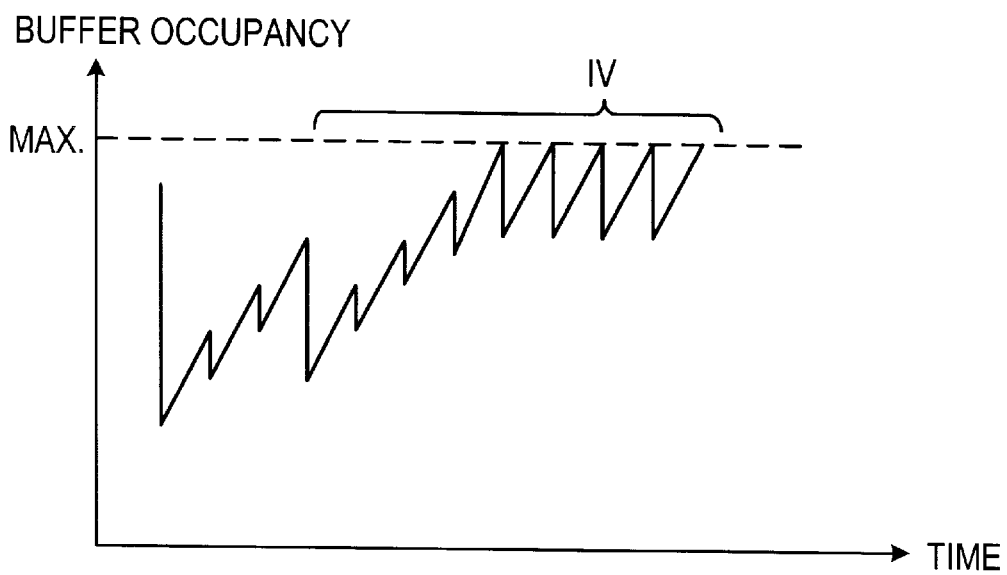
FIG. 4 is a graph showing a variation of buffer occupancy with time in a second embodiment of the present invention.

The above description is the construction of the decoder side. However, the present invention can perform a processing in the coder side concurrently. FIG. 4 is a graph showing a variation of buffer occupancy with time, for explaining a second embodiment of the present invention when it is applied to the later case.

The embodiment shown in FIG. 4 is featured by the last scene of the video data signal #1 is coded as a still picture or a picture similar to a still picture. In this case, since, when the last scene of the first variable length coded data signal #1 is compression-coded, the coding is performed for the difference, that is, the prediction error, to produce a code in this scene in which there is almost no coding data in a header of this scene is produced, the amount of code generation is small.

Therefore, in the last scene of the video data signal #1, the buffer occupancy of the decoder is not substantially reduced as shown by IV in FIG. 4 since the data amount is minute when decoded, the buffer occupancy is increased toward the maximum value. Therefore, although the occupancy of the last picture of the video data signals #1 and #2 becomes the first pattern rarely, it almost becomes the second pattern and, when it is applied to the first embodiment of the present invention, there is no possibility of both overflow and underflow and it is possible to ideally couple the video data signals.

Figure 5:
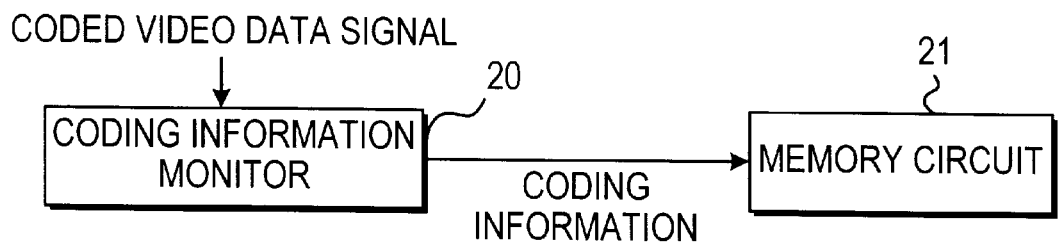
FIG. 5 is a block diagram of a main portion of a third embodiment of a device according to the present invention.
Figure 6:
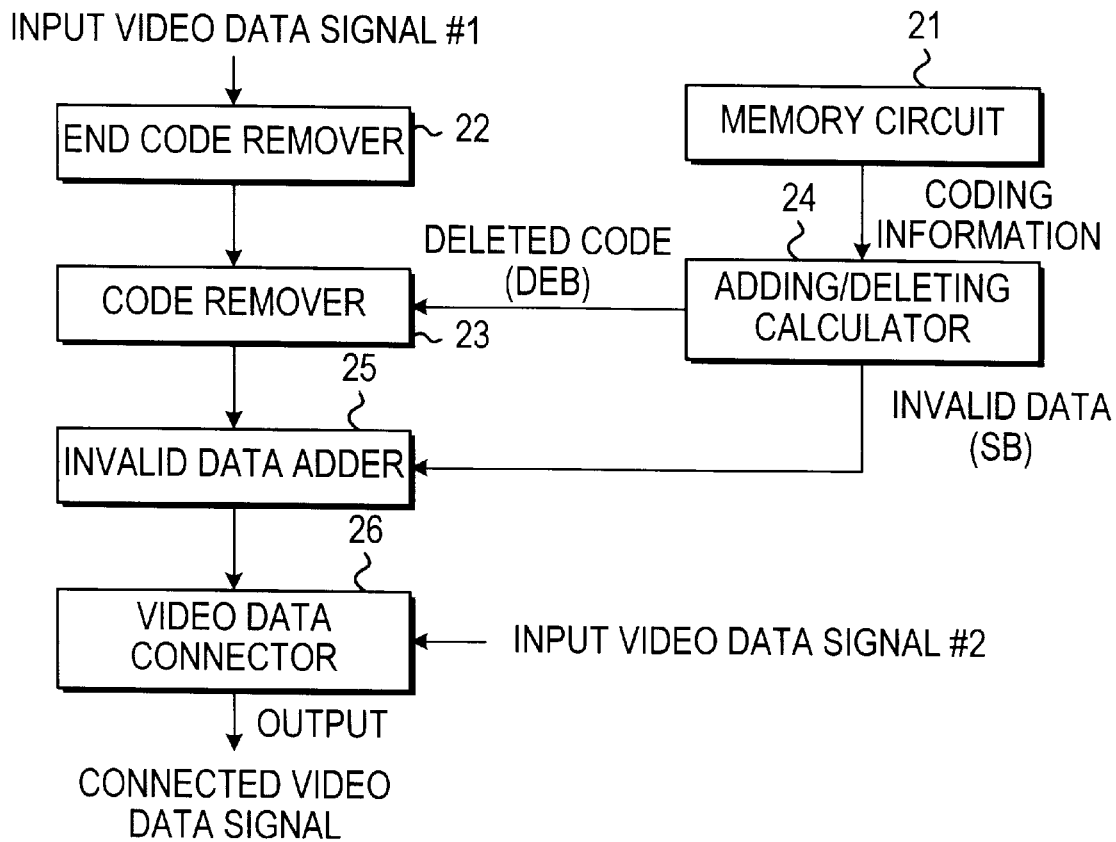
FIG. 6 is a block diagram of another main portion of a third embodiment of the device of the present invention.

Now, a third embodiment of the present invention will be described. FIG. 5 is a block diagram of a main portion of the third embodiment of the variable length coded data processing device according to the present invention and FIG. 6 is a block diagram of another main portion of the third embodiment of the variable length coded data processing device according to the present invention.

In FIG. 5, the variable length coded video data signal (coded video data signals #1, #2) are supplied to a coding information monitor 20 in which a VBV buffer occupancy (a) described in a picture header of the coded video data signals, which is defined by the MPEG standard, a VBV buffer occupancy (b) described in an end of the last picture of the coded video data signals and a code amount value (c) from a picture start code to an end code of the last picture of the coded video data signals are read out and a coding information of them is stored in a memory circuit 21.

The VBV buffer occupancy (a) corresponds to the next occupancy NOC of the buffer of the decoder at the decoding timing of the first picture of the next video data signal #2 and the VBV buffer occupancy (b) corresponds to the buffer occupancy OC of the last 1 picture of the video data signal #1 and the code amount (c) corresponds to the data bits DB of the last 1 picture of the video data signal #1.

Incidentally, in a case where, after the last 1 picture is decoded, the picture of the next video data signal #2 is input as it is, the input bits IB input to a reproducing device during a time period up to an initial decoding is calculated by dividing a transfer rate by a time of 1 picture section in the coding information monitor 20 and stored in the memory circuit 21. In order to perform such processing, it is necessary to monitor a coding information of one of a plurality of coded video data signals together with a coding information of coded video data signals preceding and succeeding to the one coded video data signal before a plurality of coded video data signals are connected.

As shown in FIG. 6, the main portion of the third embodiment of the present invention comprises an end code remover 22, a code remover 23, an adding/deleting amount calculator 24, an invalid data adder 25 and the memory circuit 21 mentioned with respect to FIG. 5. Describing an operation of the circuit shown in FIG. 6, the coding information including the buffer occupancies NOC and OC and the code amounts DB and IB, which is stored in the memory circuit 21, is supplied to the adding/deleting amount calculator 24 in which the following decision is performed to calculate the deleting amount of code and the invalid data amount.

That is, the adding/deleting amount calculator 24 calculates the stuff bits SB according to the equation (2) and sets a delete bits DEB zero when the input coding information satisfies the equation (1). When the input coding information satisfies the equation (3), the delete bits DEB is calculated according to the following equation:

$$DEB = NOC - (OC-DB+IB) \quad (4)$$

and the stuff bits SB is set zero. Further, the adding/deleting amount calculator 24 sets both the delete bits DEB and the stuff bits SB zero when the input coding information does satisfy neither the equation (1) nor the equation (3), that is, when NOC=(OC−DB+IB). The adding/deleting amount calculator 24 supplies the thus calculated delete bits DEB to the code remover 23 and the thus calculated stuff bits SB to the invalid data adder 25.

On the other hand, the coded video data signal #1 is supplied to the end code remover 22 having the same construction as that of the end code remover 11 shown in FIG. 1 for the same purpose and, after the end code of 4 bytes which is described in the last portion of the data and is according to the MPEG standard is deleted, supplied to the code remover 23 in which a code corresponding to an AC component of a picture coding data described in several frames including at least the last picture is reduced by the delete bits DEB calculated by the adding/deleting amount calculator 24. However, when DEB=0, the deletion is not performed.

Figure 7:
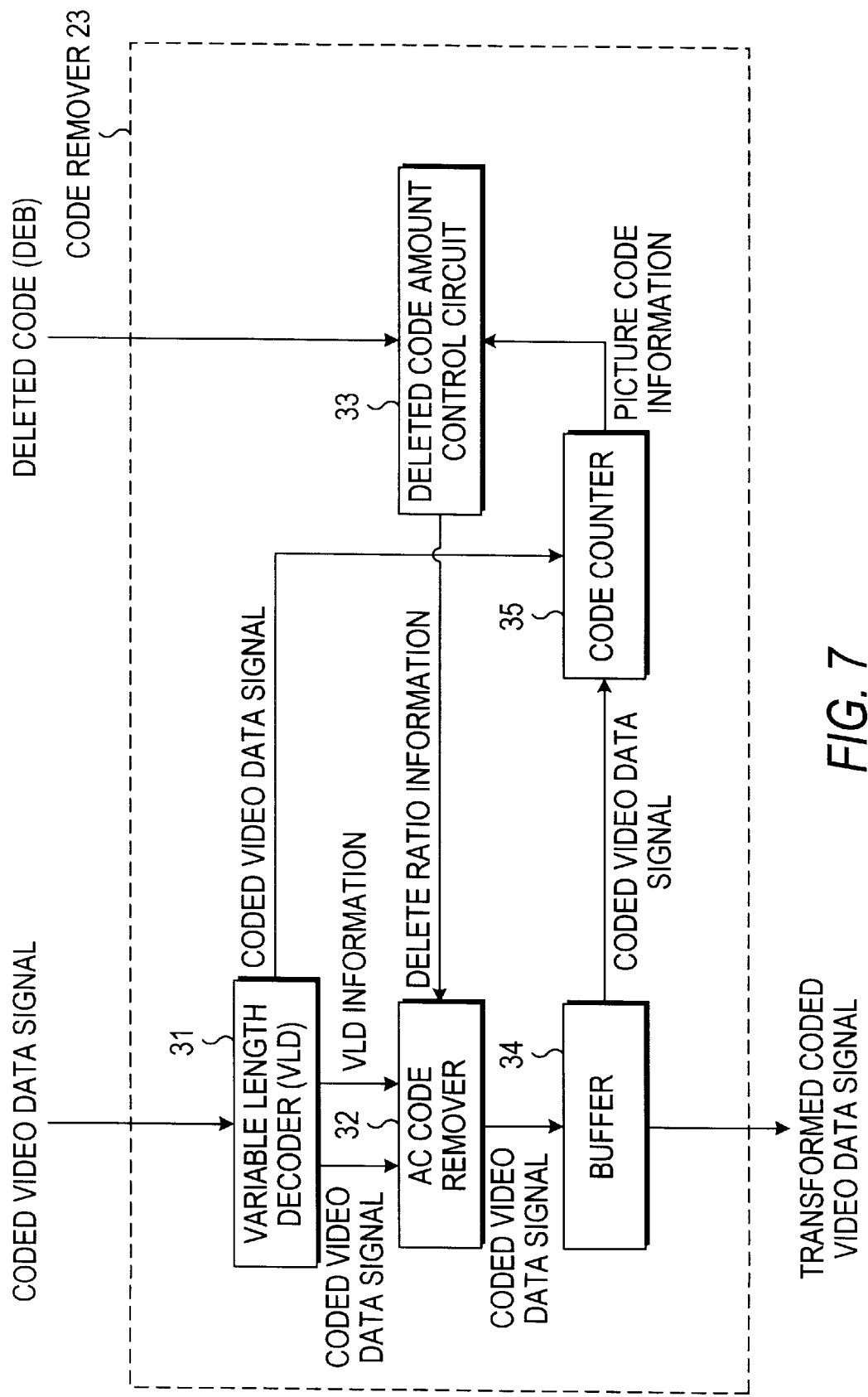
FIG. 7 is a block diagram of an example of a code remover shown in FIG. 6.

FIG. 7 is a block diagram of an example of the code remover 23. In the code remover 23, the coded video data signal #1 is supplied to a variable length decoder VLD 31 and variable length decoded. According to the MPEG standard, an AC code of a macro block of a picture is a Huffman code variable length coded (VLC) according to the following Table 1:

TABLE 1

| RUN | LEVEL | VLC CODE |
|---|---|---|
| EOB | | 10 |
| 0 | 1 | 1s IF 1st COEFF |
| 0 | 1 | 11s NOT 1st COEFF |
| 0 | 2 | 0100 s |
| 0 | 3 | 0010 1s |
| 0 | 4 | 0000 110s |
| 0 | 5 | 0010 0110 s |
| 0 | 6 | 0010 0001 s |
| 0 | 7 | 0000 0010 10s |
| 0 | 8 | 0000 0001 1101 s |
| 0 | 9 | 0000 0001 1000 s |
| 0 | 10 | 0000 0001 0011 s |
| 0 | 11 | 0000 0001 0000 s |
| 0 | 12 | 0000 0000 1101 0s |
| 0 | 13 | 0000 0000 1100 1s |
| 0 | 14 | 0000 0000 1100 0s |
| 0 | 15 | 0000 0000 1011 1s |
| 0 | 16 | 0000 0000 0111 11s |
| 0 | 17 | 0000 0000 0111 10s |
| 0 | 18 | 0000 0000 0111 01s |
| 0 | 19 | 0000 0000 0111 00s |
| 0 | 20 | 0000 0000 0110 11s |
| 0 | 21 | 0000 0000 0110 10s |
| 0 | 22 | 0000 0000 0110 01s |
| 0 | 23 | 0000 0000 0110 00s |
| 0 | 24 | 0000 0000 0101 11s |
| 0 | 25 | 0000 0000 0101 10s |
| 0 | 26 | 0000 0000 0101 01s |
| 0 | 27 | 0000 0000 0101 00s |
| 0 | 28 | 0000 0000 0100 11s |
| 0 | 29 | 0000 0000 0100 10s |
| 0 | 30 | 0000 0000 0100 01s |
| 0 | 31 | 0000 0000 0100 00s |
| 0 | 32 | 0000 0000 0011 000s |
| 0 | 33 | 0000 0000 0010 111s |
| 0 | 34 | 0000 0000 0010 110s |
| 0 | 35 | 0000 0000 0010 101s |
| 0 | 36 | 0000 0000 0010 100s |
| 0 | 37 | 0000 0000 0010 011s |
| 0 | 38 | 0000 0000 0010 010s |
| 0 | 39 | 0000 0000 0010 001s |
| 0 | 40 | 0000 0000 0010 000s |
| 1 | 1 | 011s |
| 1 | 2 | 0001 10s |
| 1 | 3 | 0010 0101 s |
| 1 | 4 | 0000 0011 00s |
| 1 | 5 | 0000 0001 1011 s |
| 1 | 6 | 0000 0000 1011 0s |
| 1 | 7 | 0000 0000 1010 1s |
| 1 | 8 | 0000 0000 0011 111s |
| 1 | 9 | 0000 0000 0011 110s |
| 1 | 10 | 0000 0000 0011 101s |
| 1 | 11 | 0000 0000 0011 100s |
| 1 | 12 | 0000 0006 0011 011s |
| 1 | 13 | 0000 0000 0011 010s |
| 1 | 14 | 0000 0000 0011 001s |
| 1 | 15 | 0000 0000 0001 0011s |
| 1 | 16 | 0000 0000 0001 0010s |
| 1 | 17 | 0000 0000 0001 0001s |
| 1 | 18 | 0000 0000 0001 0000s |
| 2 | 1 | 0101 s |
| 2 | 2 | 0000 100s |
| 2 | 3 | 0000 0010 11s |
| 2 | 4 | 0000 0001 0100 s |
| 2 | 5 | 0000 0000 1010 0s |
| 3 | 1 | 0011 1s |
| 3 | 2 | 0010 0100 s |
| 3 | 3 | 0000 0001 1100 s |
| 3 | 4 | 0000 0000 1001 1s |
| 4 | 1 | 0011 0s |
| 4 | 2 | 0000 0011 11s |
| 4 | 3 | 0000 0001 0010 s |
| 5 | 1 | 0001 11s |
| 5 | 2 | 0000 0010 01s |
| 5 | 3 | 0000 0000 1001 0s |
| 6 | 1 | 0001 01s |
| 6 | 2 | 0000 0001 1110 s |
| 6 | 3 | 0000 0000 0001 0100s |
| 7 | 1 | 0001 00s |
| 7 | 2 | 0000 0001 0101 s |
| 8 | 1 | 0000 111s |
| 8 | 2 | 0000 0001 0001 s |
| 9 | 1 | 0000 101s |
| 9 | 2 | 0000 0000 1000 1s |
| 10 | 1 | 0010 0111 s |
| 10 | 2 | 0000 0000 1000 0s |
| 11 | 1 | 0010 0011 s |
| 11 | 2 | 0000 0000 0001 1010s |
| 12 | 1 | 0010 0010 s |
| 12 | 2 | 0000 0000 0001 1001s |
| 13 | 1 | 0010 0000 s |
| 13 | 2 | 0000 0000 0001 1000s |
| 14 | 1 | 0000 0011 10s |
| 14 | 2 | 0000 0000 0001 0111s |
| 15 | 1 | 0000 0011 01s |
| 15 | 2 | 0000 0000 0001 0110s |
| 16 | 1 | 0000 0010 00s |
| 16 | 2 | 0000 0000 0001 0101s |
| 17 | 1 | 0000 0001 1111 s |
| 18 | 1 | 0000 0001 1010 s |
| 19 | 1 | 0000 0001 1001 s |
| 20 | 1 | 0000 0001 0111 s |
| 21 | 1 | 0000 0001 0110 s |
| 22 | 1 | 0000 0000 1111 1s |
| 23 | 1 | 0000 0000 1111 0s |
| 24 | 1 | 0000 0000 1110 1s |
| 25 | 1 | 0000 0000 1110 0s |
| 26 | 1 | 0000 0000 1101 1s |
| 27 | 1 | 0000 0000 0001 1111s |
| 28 | 1 | 0000 0000 0001 1110s |
| 29 | 1 | 0000 0000 0001 1101s |
| 30 | 1 | 0000 0000 0001 1100s |
| 31 | 1 | 0000 0000 0001 1011s |
| ESCAPE | | 0000 01 |

In the Table 1, the last bit s of each variable length code represents a code of LEVEL and is positive when it is 0 and negative when it is 1.

There are six 8×8 pixel blocks, 4 luminance signals and 2 chrominance signals, in the macro block and there is the A.C. code in each of the pixel block. The Huffman code event in these pixel blocks is represented by a combination of the RUN indicative of the number of continuously occurring 0×s and the LEVEL of non-zero valid coefficients succeeding thereto up to a time when a valid coefficient which is non-zero is detected when the quantized transform coefficients are arranged in zigzag manner from a low spatial frequency component toward high spatial frequency, as shown in FIG. 9.

Figure 9:
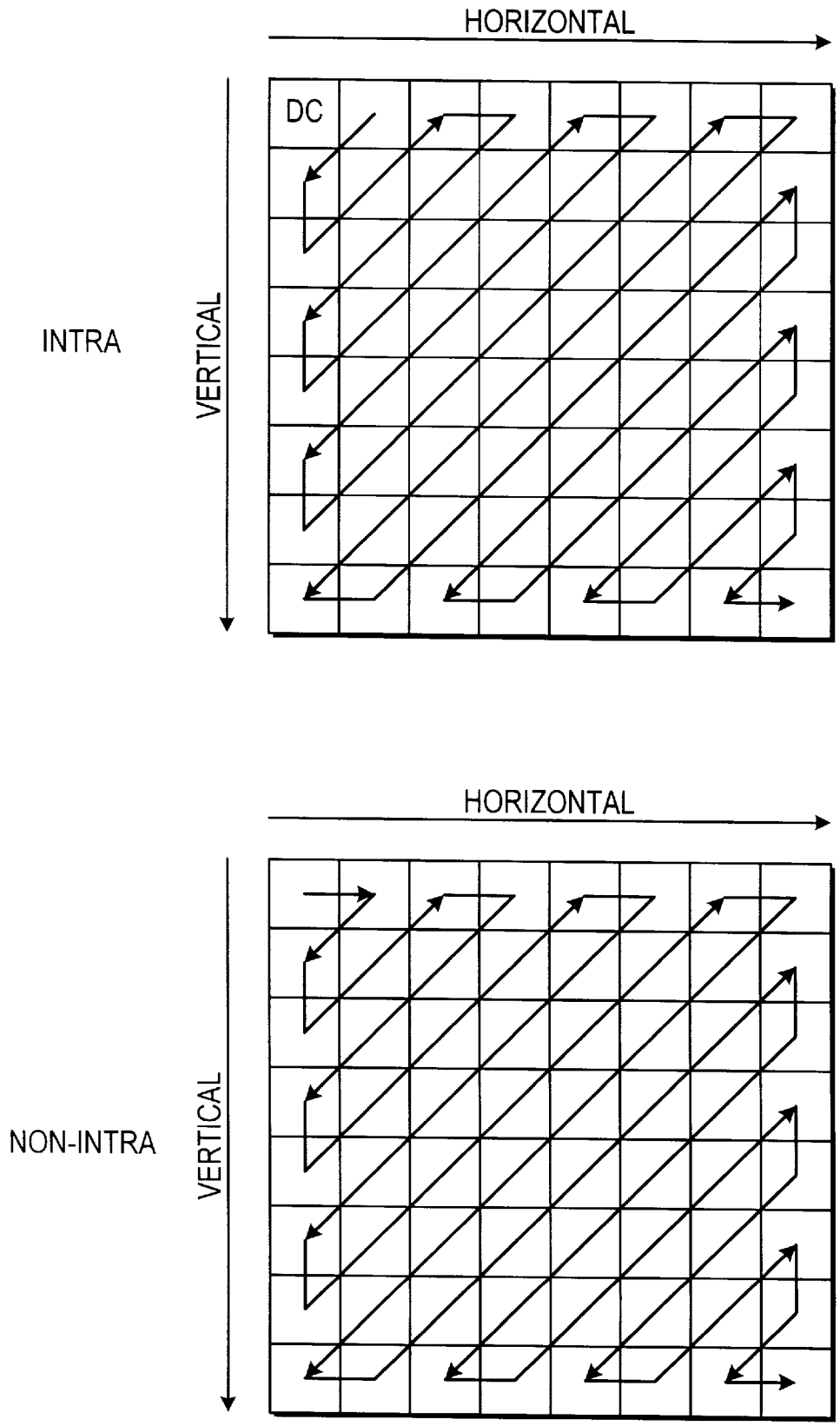
FIG. 9 illustrates a zigzag scan of A.C. coefficient.
Figures 10, 12:
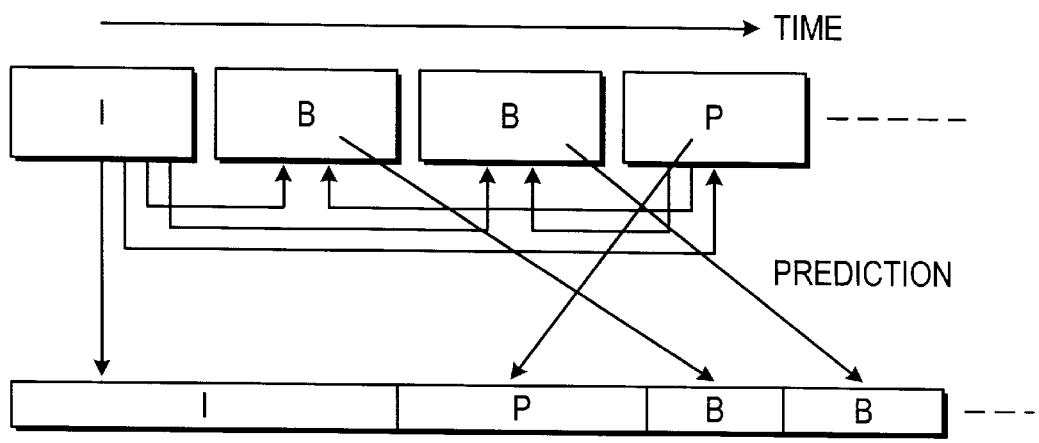
FIG. 10 shows an example of A.C. coefficient (code)
FIG. 12 illustrates an amount of generated code in a picture type of MPEG.
Figure 13:
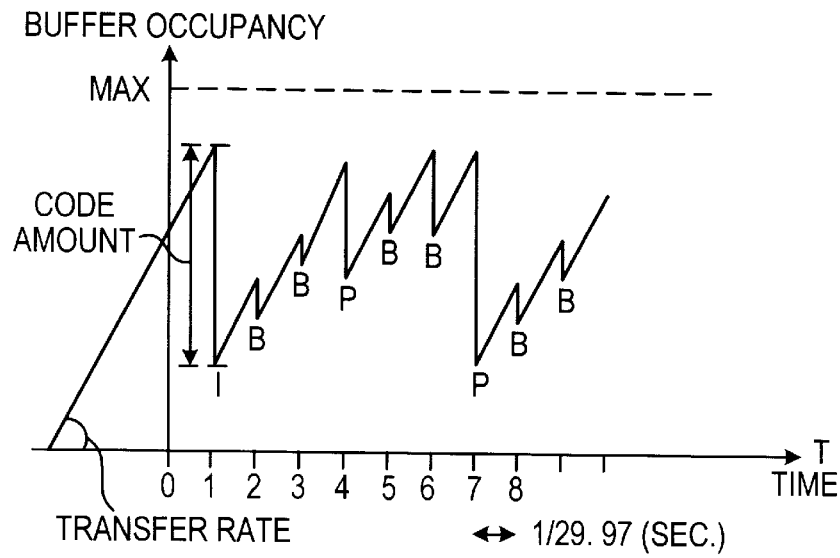
FIG. 13 shows an example of a variation of buffer occupancy of a decoder with time.
Figure 14:
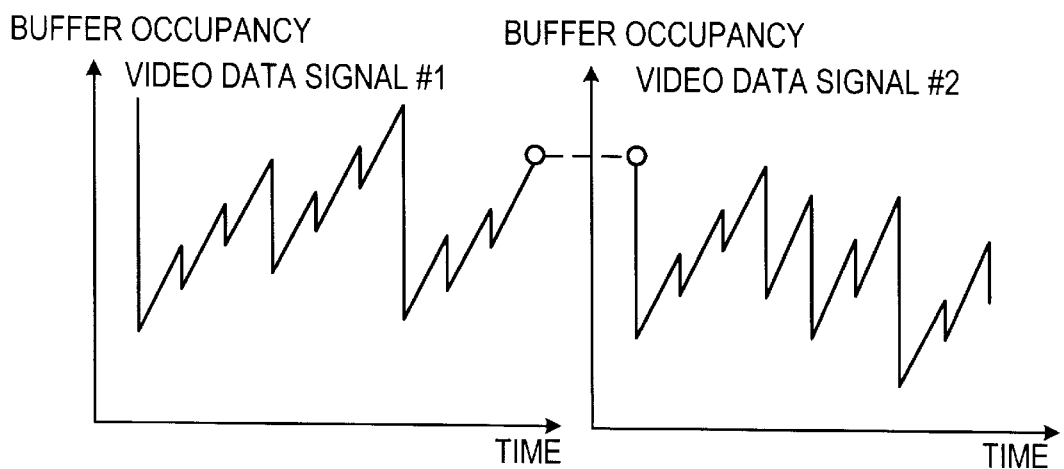
FIG. 14 show graphs for explaining an example of a coupling of two video data signals.

That is, when these are extended, INTRA (intra-frame coding) and non-INTRA are different dependent on whether or not the initial coefficient is a D.C. component as shown in FIG. 9. However, these are extended in an area of 8×8 pixels, respectively, as shown in FIG. 10. And, the coded video data signal is one variable length coded on the basis of the combinations of the RUN's and the LEVEL's, according to the Table 1.

The VLD 31 shown in FIG. 7 detects the "RUN and LEVEL" event and the code length of the A.C. code (A.C. coefficient), calculates the sequence of the A.C. codes sent, that is, an accumulated code amount of the code lengths when they are arranged from low frequency signal toward high frequency signal and addresses indicative of the coefficient positions when scanned in zigzag manner, as shown in FIG. 11, and outputs the thus obtained information to the A.C. code remover 32 shown in FIG. 7 as the VLD information, together with the coded video data signal.

On the other hand, a deleted code amount control circuit 33 shown in FIG. 7 calculates a deleting ratio on the basis of the delete bits DEB input from the adding/deleting amount calculator 24 shown in FIG. 6 and the information of amount of picture code to be deleted which is supplied from a code amount counter 35 shown in FIG. 7 and supplies a result of the calculation to the AC code remover 32 as the deleting ratio information.

The A.C. code remover 32 responds to the coded video data signal and the VLD information from the VDL 31 and the deleting ratio information from the deleting code amount control circuit 33 to delete the A.C. code of the coded video data signal. The VLD information includes the A.C. code and its code length. The A.C. code remover 32 decides a value up to a value which is obtained by multiplying {1−(deleting ratio)} with a total code amount which is the last value of the accumulated code amount of the code length when the orthogonally transformed coefficients are arranged from low spatial frequency component toward high frequency component as shown in FIG. 10 as valid and deletes codes subsequent thereto. An end-of-block (EOB) code is attached to the A.C. code after deleted. By this operation, the A.C. codes in the respective blocks are deleted correspondingly to the deleting ratios.

The coded video data signal having the blocks for which the deleting processing is performed is accumulated in a one picture buffer 34 and then the whole codes of a picture is counted by the code amount counter 35. The picture code amount information indicative of the total code amount of the picture obtained by the code amount counter 35 is supplied to the deleting code amount control circuit 33. The coded data of picture deleted from the buffer 34 is sent through the code amount counter 35 to the VLD 31.

The above operation is repeated until the deleting ratio calculated by the deleting code amount control circuit 33 becomes 0 or lower and, when the deleting ratio becomes 0 or lower, the code amount to be finally deleted is deleted. The A.C. code remover 32 completes the deleting operation and outputs to the buffer 34 as the transformed coded video data signal. In this case, the A.C. code remover 32 transmits other portion than the A.C. code to the buffer 27 without any operation of it.

When one picture is to be deleted, there may a case where a large degradation occurs in only one picture. Further, there may a case where a predetermined amount of deletion can not be achieved by only one picture. In the latter case, it may be possible to deliver a code to be deleted by equally dividing it to not only the last picture but also a plurality of pictures from the last picture or dividing it according to the generated code amount ratio of these pictures.

Returning to FIG. 6, the video data signal from the code remover 23 which has a code corresponding to the A.C. component of the picture coding data described in the several frames including at least the last picture deleted by the delete bits DEB which is calculated by the adding/deleting amount calculator 24 is supplied to the invalid data adder 25 in which the stuff bits data whose amount corresponds to the stuff bits SB from the adding/deleting amount calculator 24 is added thereto, a resultant video data signal being output as the transformed coded video data signal. As the stuff bits data, the invalid data (null data (0 data)) defined by the MPEG.

The coded video data signal thus processed is supplied to a video data connector 26 similar to the video data connector 15 shown in FIG. 1, directly connected to the coded video data signal #2 to be connected next and output as a connected video data signal. In this embodiment, it is possible to directly connect the coded input video data signal #1 and the coded input video data signal #2 as shown in FIGS. 2(A), 2(B), 2(C ) and 3.

For example, in the case of the third pattern such as shown in FIG. 3 in which the value (OC−DB+IB) which is the sum of the difference between the buffer occupancy OC of the last 1 picture of the video data signal #1 and the code amount, that is, data bits DB of the last 1 picture and the input code amount value, that is, input bits IB, is smaller than the buffer occupancy NOC at the decoding timing of the first picture of the next video data signal #2, the adding/deleting amount calculator 24 calculates the delete bits DEB according to the equation (4) and the stuff bits SB is made zero. Therefore, the last picture of the video data signal #1 is connected to the next video data signal #1 with the buffer occupancy being the same as the buffer occupancy NOC at the decoding timing of the first picture of the video data signal #2. Therefore, according to this embodiment, it is possible to ideally connect the video data signals without overflow or underflow even in the case of the third pattern.

As mentioned, according to this embodiment, it is possible to connect the coded video data signals which are coded without preliminary consideration of their connection without damage of the bit stream buffer of the decoder even when these coded video data signals are directly connected, since they are under the MPEG standard.

Since, when the above mentioned A.C. code deleting processing is performed, the next unidirectional inter-picture prediction for the P picture and the I picture of the MPEG are performed circuitously by this processing, error is accumulated, causing the picture degradation to tend to be enhanced. In such case, it is effective that the deletion of the A.C. code is limited to the bidirectional inter-picture predictive coded B picture. By this scheme, it is possible to prevent the accumulation of error due to the circuit of prediction.

Now, a fourth embodiment of the present invention will be described. In this embodiment, the concept of the skipped macro block (Skipped-MB) of the P and B pictures in the MPEG is utilized. That is, among macro blocks (MB's), a MB whose motion vector (MV) is predicted as 0 and which includes no error in a difference picture between a predicting picture and a picture to be predicted includes a mode in which neither D.C. data nor A.C. data is sent (in this case, however, it is possible for the B picture that, even when the motion vector of one MB is not 0, it is enough that a difference between the motion vector of that MB and that of a preceding MB is 0).

Assuming that such MB's exist throughout the screen, nothing other than headers of the minimum number of pictures or slices is required. For example, assuming in MPEG1 that, although the first and last MB's of a slice can not be made Skipped-MB's and MB's other than these MB's on substantially the whole screen are made Skipped-MB's, they can be coded by using 256 to 1000 bits although the number of bits depends on the construction (number) of the slices. A P picture or a B picture having this code includes no motion on its predicted image. By using this positively, that is, using the code under assumption that the Skipped-MB's exist of the whole screen in lieu of a code of a P picture or a B picture, it is possible to modify the coded data of an image as the same as the preceding predicted image.

This is a code according to the MPEG standard, with which, if an actual input image were an image having a completely stationary portion corresponding thereto, the same coded data could be output as a result. Since the code of a picture under assumption that the Skipped-MB's exist on the whole screen is a simple inter-frame prediction (NoMC), this code is non-coded code (NotCoded) having no DCT coefficient. Representing such code by NoMC, NotCoded code, the NoMC,NotCoded code can be determined primarily and has no dependency on a prediction image. Therefore, this code is preliminarily stored in a read-only-memory (ROM) and the code of a P or B picture is exchanged by the NoMC,NotCoded code on demand.

In this case, a decoded image is of course stationary.

Figure 8:
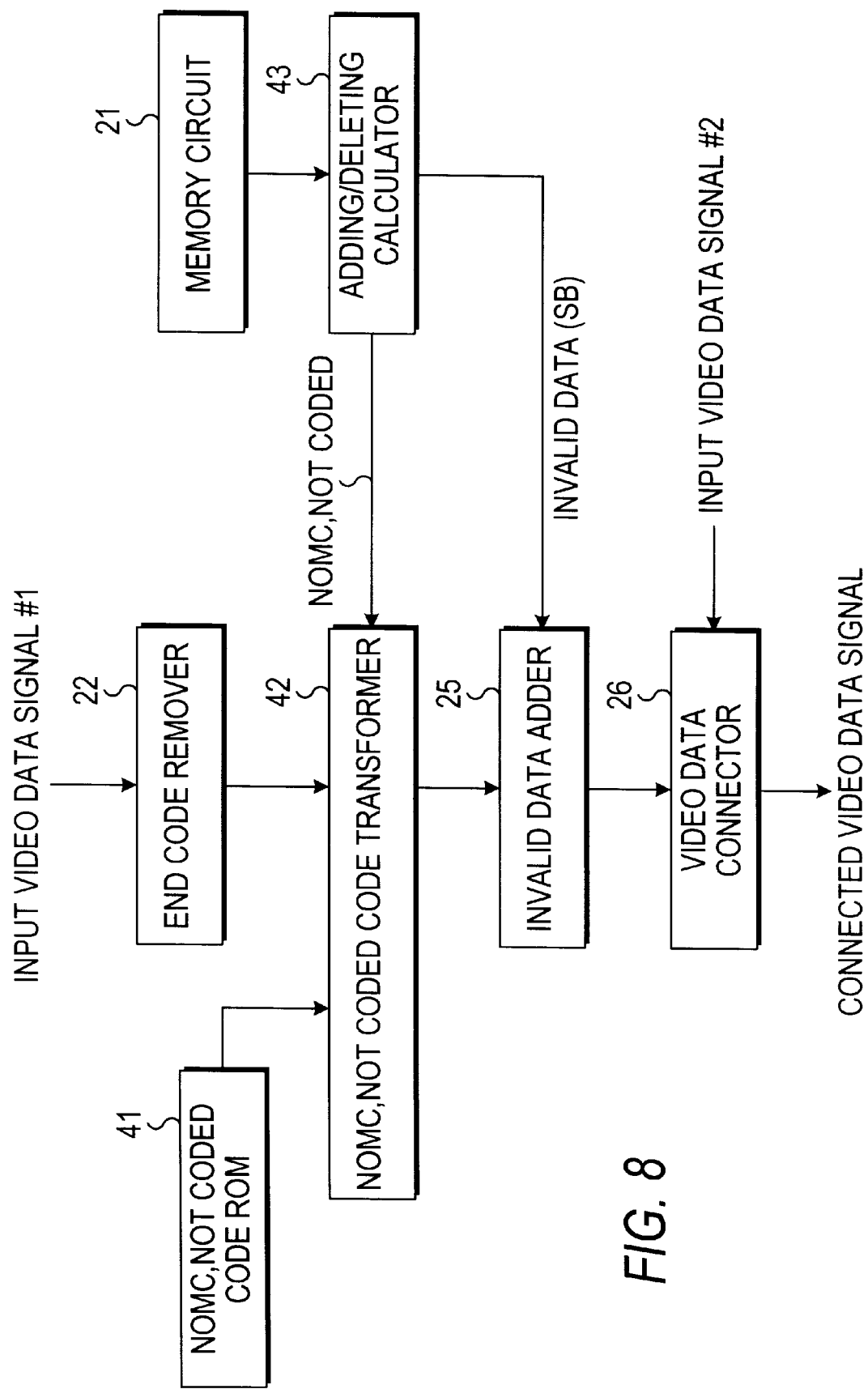
FIG. 8 is a block diagram of a fourth embodiment of the device of the present invention.

However, it is possible to realize the processing at a higher speed with a lower cost compared with the processing of the A.C. code remover 32. Further, it is possible to substantially increase the buffer occupancy compared with the A.C. deletion. FIG. 8 is a block diagram of a fourth embodiment of the present invention which utilizes this function. In FIG. 8, the same constructive components as those in FIG. 6 are depicted by the same reference numerals, respectively, without detailed description thereof.

In FIG. 8, a coding information including the buffer occupancies NOC and OC and the code amounts DB and IB is supplied from a memory circuit 21 to a adding/deleting amount calculator 43 in which the invalid data amount, that is, stuff bits, SB is calculated and the NoMC,NotCoded code transform flag is produced, as to be described later. An amount of the preliminarily produced NoMC,NotCoded code is represented by NMNC bits.

That is, the adding/deleting amount calculator 43 calculates the stuff bits SB according to the equation (2) when the input coding information satisfies NOC<(OC−DB+IB) and makes the delete bits DEB zero. When the input coding information satisfies NOC>(OC−DB+IB), the calculator 43 calculates the delete bits DEB according to the equation (4) and makes the stuff bits SB zero and the NoMC,NotCoded code transform flag "1" and replaces DB by NMNC.

Further, the adding/deleting amount calculator 43 makes both the DEB and SB zero when the input coding information satisfies neither the equation (1) nor the equation (3), that is, when NOC=(OC−DB+IB), and makes the NoMC, NotCoded code transform flag "0". The adding/deleting amount calculator 43 supplies the thus calculated NoMC, NotCoded code transform flag to a NoMC, NotCoded code transformer 42 and the SB to an invalid data adder 25.

On the other hand, the coded input video data signal #1 is supplied to the NoMC,NotCoded transformer 42 after its end code is removed by an end code remover 22. The NoMC,NotCoded code transformer 42 transforms the input picture coding data into the NoMC,NotCoded code only when the NoMC,NotCoded code transform flag is "1". This NoMC,NotCoded code is read out from a NoMC,NotCoded code ROM 41. The NoMC,NotCoded code transformer 42 does no transform processing when the NoMC,NotCoded code transform flag is "0".

The video data signal thus transformed is supplied to the invalid data adder 25 and, after the invalid data corresponding to the stuff bits SB from the adding/deleting amount calculator 43 is added thereto, supplied to a video data connector 26 in which it is directly connected to the coded video data signal #2 to be coupled next, resulting in a connected video data signal.

According to this embodiment, it is possible to connect the coded video data signals which are coded without preliminary consideration of their connection without damage of the bit stream buffer of the decoder even when these coded video data signals are directly connected, since they are under the MPEG standard. Further, since, in this embodiment, the A.C. code is not deleted and is replaced by a code which repeats the frame with using the minimum number of codes, it is possible to regulate the occupancy of the buffer of the decoder very simply.

The present invention is not limited to the described embodiments and the variable length coded data to be coupled may be any other data than the video data, so long as the data is variable length coded and the decoder includes a buffer.

As described hereinbefore, according to the present invention, the buffer occupancy of the data of the last compressed portion of the first variable length coded data at the decoding timing thereof is reduced by the data amount of stuff bits by calculating the amount of data is calculated according to a result of comparison of a value related to a buffer occupancy at a decoding timing of a last compressed portion data of the first variable length coded data with a buffer occupation value at a decoding timing of a first compressed portion data of the second variable length coded data, adding the calculated stuff bits to the last compressed portion data of the first variable length coded data and coupling the second variable length coded data. Therefore, it is possible to prevent the buffer of the decoder from at least overflowing and to eliminate the data drop out due to the coupling. Further, since it is possible to freeze one or two frames in coupling the data even when underflow occurs, the inconvenience in coupling the data can be substantially reduced compared with the conventional method.

Further, according to the present invention, it is possible to connect data of the last compressed portion of a first variable length coded data to data of the first compressed portion of a second variable length coded data with the same occupancies of a buffer of a decoder by deleting a code corresponding to an A.C. component of data described in data of a predetermined number of compressed portions of the first variable length coded data, which includes the data of at least the last compressed portion thereof by an amount of deleting code or by coding the data described in the data of the predetermined number of compressed portions, which includes the data of at least the last compressed portion thereof under assumption that the motion vector thereof is 0 and the motion compensated error data is 0. Therefore, it is possible to connect two variable length coded data without failure such as overflow or underflow of the buffer of the decoder. Consequently, according to the present invention, it is possible to randomly connect a plurality of preliminarily variable length coded data and to reproduce a video data continuously for a predetermined time.

Further, according to the present invention, the last scene of the first variable length coded data is coded to a still picture or a picture which can be approximated to a still picture. Therefore, it is possible to minimize an amount of code produced in the last scene and to make the shift amount of the buffer occupancy the maximum value. Therefore, it is possible to prevent both overflow and underflow of the buffer by adding the stuff bits and to couple two variable length coded data ideally.

What is claimed is:

1. A variable length coded data processing method, in which a first and second variable length coded data having end codes at rear ends thereof and each comprised of a plurality of compressed portion data are coupled and output to a buffer of a decoder, comprising the steps of:

deleting the end code of the first variable length coded data;

calculating an invalid data of an amount corresponding to a result of comparison of a value related to a buffer occupancy at a decoding timing of a last compressed portion data of the first variable length coded data with a buffer occupancy at a decoding timing of a first compressed portion data of the second variable length coded data;

adding the calculated invalid data to the last compressed portion data of the first variable length coded data; and coupling the second variable length coded data thereto and outputting it to the decoder buffer.

2. A variable length coded data processing method as claimed in claim 1, wherein the value related to the buffer occupancy at the decoding timing of the last compressed portion data of the first variable length coded data is represented by (OC−DB+IB) where OC is the buffer occupancy of the last compressed portion data of the first variable length coded data at the decoding timing thereof, DB is the amount of code of the last compressed portion data and IB is the amount of code input to the decoder during a time period from a time at which the last compressed portion data is decoded to a time at which a next compressed portion data is decoded, and the data amount of the invalid data is represented by {(OC−DB+IB)−NOC} when NOC<(OC−DB+IB) and is 0 when NOC≧(OC−DB+IB), where NOC is the buffer occupancy of a first compressed portion data of the second variable length coded data at the decoding timing thereof.

3. A variable length coded data processing method as claimed in claim 1, wherein the compressed portion data is a picture of a frame compression difference picture data and each of the first and second variable length coded data is a video data composed of a plurality of pictures.

4. A variable length coded data processing method, in which, after a coefficient obtained by an orthogonal transform of an input signal is quantized, a first and second variable length coded data having end codes at rear ends thereof and each comprised of a plurality of compressed portion data such that an occupancy of a buffer of a decoder does neither overflow nor underflow are coupled and output to the buffer of the decoder, comprising the steps of:

deleting the end code of the first variable length coded data;

calculating an amount of deleted code of a data amount of a difference value between a value related to the buffer occupancy at a decoding timing of the last compressed portion data of the first variable length coded data and the buffer occupancy at the decoding timing of the first compressed portion of the second variable length coded data when the value related to the buffer occupancy at a decoding timing of the last compressed portion data of the first variable length coded data is smaller than the buffer occupancy at the decoding timing of the first compressed portion of the second variable length coded data;

deleting a code corresponding to an A.C. component of data described in a predetermined number of compressed portion data including at least the last compressed portion data of the first variable length coded data by the amount of deleted code; and coupling the second variable length coded data to the first variable length coded data.

5. A variable length coded data processing method as claimed in claim 4, wherein the value related to the buffer occupancy at the decoding timing of the last compressed portion data of the first variable length coded data is represented by (OC−DB+IB) where OC is the buffer occupancy of the last compressed portion data of the first variable length coded data at the decoding timing thereof, DB is the amount of code of the last compressed portion data and IB is the amount of code input to the decoder during a time period from a time at which the last compressed portion data is decoded to a time at which a next compressed portion data is decoded, and the data amount of invalid data is represented by {NOC−(OC−DB+IB)} only when NOC>(OC−DB+IB) and is 0 when NOC≦(OC−DB+IB), where NOC is the buffer occupancy of an initial compressed portion data of the second variable length coded data at the decoding timing thereof.

6. A variable length coded data processing method as claimed in claim 4, wherein the compressed portion data is a picture of a frame compression difference picture data and each of the first and second variable length coded data is a video data composed of a plurality of pictures.

7. A variable length coded data processing method, in which, after a coefficient obtained by an orthogonal transform of an input signal is quantized, a first and second variable length coded data having end codes at rear ends thereof and each comprised of a plurality of compressed portion data such that an occupancy of a buffer of a decoder does neither overflow nor underflow are coupled and output to the buffer of the decoder, comprising the steps of:

deleting the end code of the first variable length coded data;

coding data described in a predetermined number of compressed data including at least the last compressed portion data of the first variable length coded data under a condition that a motion vector is 0 and a motion compensated error data is 0 when a value related to the buffer occupancy at a decoding timing of the last compressed portion data of the first variable length coded data is smaller than the buffer occupancy at the decoding timing of the first compressed portion of the second variable length coded data; and coupling the second variable length coded data to the first variable length coded data.

8. A variable length coded data processing method as claimed in claim 7, wherein the compressed portion data is a picture of a frame compression difference picture data and each of the first and second variable length coded data is a video data composed of a plurality of pictures.

9. A variable length coded data processing device in which a first and second variable length coded data having end codes at rear ends thereof and each comprised of a plurality of compressed portion data are coupled and output to a buffer of a decoder, comprising:

an end code remover for deleting the end code of the first variable length coded data;

a calculator for calculating an invalid data of a data amount corresponding to a result of comparison of a value related to a buffer occupancy at a decoding timing of a last compressed portion data of the first variable length coded data, the end code thereof being deleted by said end code remover, with a buffer occupancy at a decoding timing of a first compressed portion data of the second variable length coded data;

an adder for adding the invalid data calculated by said calculator to the last compressed portion data of the first variable length coded data of which the end code is deleted ; and a connector for coupling the second variable length coded data to the first variable length coded data added with the invalid data from said adder and outputting it to said decoder buffer.

10. A variable length coded data processing device as claimed in claim 9, wherein said calculator calculates the data amount of the invalid data by {(OC−DB+IB)−NOC} when NOC<(OC−DB+IB) and is 0 when NOC≧(OC−DB+IB), where OC is the buffer occupancy of the last compressed portion data of the first variable length coded data at the decoding timing thereof, DB is the amount of code of the last compressed portion data, IB is the amount of code input to said decoder during a time period from a time at which the last compressed portion data is decoded to a time at which a next compressed portion data is decoded and NOC is the buffer occupancy of an initial compressed portion data of the second variable length coded data at the decoding timing thereof.

11. A variable length coded data processing device as claimed in claim 9, wherein the compressed portion data is a picture of a frame compression difference picture data and each of the first and second variable length coded data is a video data composed of a plurality of pictures.

12. A variable length coded data processing device as claimed in claim 11, wherein the last scene of the first variable length coded data is coded to a still picture or a picture which can be approximated to a still picture.

13. A variable length coded data processing device as claimed in claim 9, wherein the coupling of the first and second variable length coded data is repeated continuously for a plurality of variable length coded data for a predetermined time.

14. A variable length coded data processing device in which a first and second variable length coded data having end codes at rear ends thereof and each comprised of a plurality of compressed portion data are variable length coded such that an occupancy of a buffer of a decoder does neither overflow nor underflow after a coefficient obtained by an orthogonal transform of an input signal, coupled and output to the buffer of the decoder, comprising:

a memory circuit for preliminarily storing the buffer occupancy OC of the last compressed portion data of the first variable length coded data at the decoding timing thereof, the amount DB of code of the last compressed portion data, the amount IB of code input to said decoder during a time period from a time at which the last compressed portion data is decoded to a time at which a next compressed portion data is decoded and the buffer occupancy NOC of a first compressed portion data of the second variable length coded data at the decoding timing thereof, as a coding information;

an end code remover for deleting the end code of the first variable length coded data;

a calculator for calculating, on the basis of the coding information read out from said memory circuit, a value represented by (OC−DB+IB), comparing the latter value with the buffer occupancy NOC and calculating an amount of delete code as $\{(OC-DB+IB)-NOC\}$ when $NOC>(OC-DB+IB)$ and 0 when $NOC \leqq (OC-DB+IB)$;

a code remover for deleting a code corresponding to an A.C. component of data described in a predetermined number of compressed portion data including at least the last compressed portion data of the first variable length coded data derived from said end code remover, by the amount of delete code input from said calculator; and a connector for coupling the second variable length coded data to the first variable length coded data output from said code remover.

15. A variable length coded data processing device as claimed in claim 14, wherein said calculator further calculates a value represented by $\{(OC-DB+IB)-NOC\}$ when $NOC<(OC-DB+IB)$ and 0 when $NOC>(OC-DB+IB)$ as an invalid data amount, and further comprising an invalid data adder for adding the invalid data having the invalid data amount input from said calculator to the last compressed portion data of the first variable length coded data output from said code remover or said transform means and supplying a result to said connector.

16. A variable length coded data processing device as claimed in claim 14, wherein the compressed portion data is a picture of a frame compression difference picture data and each of the first and second variable length coded data is a video data composed of a plurality of pictures.

17. A variable length coded data processing device as claimed in claims 14, wherein the coupling of the first and second variable length coded data is repeated continuously for a plurality of variable length coded data for a predetermined time.

18. A variable length coded data processing device in which a first and second variable length coded data having end codes at rear ends thereof and each comprised of a plurality of compressed portion data are variable length coded such that an occupancy of a buffer of a decoder does neither overflow nor underflow after a coefficient obtained by an orthogonal transform of an input signal, coupled and output to the buffer of the decoder, comprising:

a memory circuit for preliminarily storing the buffer occupancy OC of the last compressed portion data of the first variable length coded data at the decoding timing thereof, the amount DB of code of the last compressed portion data, the amount IB of code input to said decoder during a time period from a time at which the last compressed portion data is decoded to a time at which a next compressed portion data is decoded and the buffer occupancy NOC of a first compressed portion data of the second variable length coded data at the decoding timing thereof, as a coding information;

an end code remover for deleting the end code of the first variable length coded data;

a calculator for calculating, on the basis of the coding information read out from said memory circuit, a value represented by (OC−DB+IB), comparing the latter value with the buffer occupancy NOC and setting a code transform flag to a predetermined value only when $NOC>(OC-DB+IB)$;

transform means for coding data described in a predetermined number of compressed portion data including at least the last compressed portion data of the first variable length coded data output from said end code remover under a condition that a motion vector is 0 and a motion compensated error data is 0 when the code transform flag output from said calculator is the predetermined value; and a connector for coupling the second variable length coded data to the first variable length coded data output from said code remover.

19. A variable length coded data processing device as claimed in claim 18, wherein said calculator further calculates a value represented by $\{(OC-DB+IB)-NOC\}$ when $NOC<(OC-DB+IB)$ and 0 when $NOC>(OC-DB+IB)$ as an invalid data amount, and further comprising an invalid data adder for adding the invalid data having the invalid data amount input from said calculator to the last compressed portion data of the first variable length coded data output from said code remover or said transform means and supplying a result to said connector.

20. A variable length coded data processing device as claimed in claim 18, wherein the compressed portion data is a picture of a frame compression difference picture data and each of the first and second variable length coded data is a video data composed of a plurality of pictures.

* * * * *